United States Patent [19]

Tong et al.

[11] Patent Number: 4,962,428
[45] Date of Patent: Oct. 9, 1990

[54] MULTISTANDARD OSD IN A TV RECEIVER INCLUDING DISPLAY POSITIONING

[75] Inventors: Hing Y. Tong, Tsuen Wan; Gerald K. Lunn, Kowloon, both of Hong Kong

[73] Assignee: Motorola, Inc., Schaumburg, Ill.

[21] Appl. No.: 340,640

[22] Filed: Apr. 20, 1989

[51] Int. Cl.[5] .................... H04N 5/44; H04N 5/272; H04N 7/01; H04N 9/74
[52] U.S. Cl. ...................................... 358/188; 358/22; 358/140; 358/183
[58] Field of Search ................ 358/140, 141, 188, 23, 358/19, 60, 148, 183, 22; 307/516

[56] References Cited
U.S. PATENT DOCUMENTS

| | | | |
|---|---|---|---|
| 4,607,236 | 8/1986 | LeQueáu | 331/27 |
| 4,661,844 | 4/1987 | Rufray | 358/23 |
| 4,682,209 | 7/1987 | Nillesen | 358/19 |
| 4,802,009 | 1/1989 | Hartmeier | 358/140 |
| 4,816,908 | 3/1989 | Colineau | 358/60 |

Primary Examiner—John K. Peng
Attorney, Agent, or Firm—Michael D. Bingham

[57] ABSTRACT

In a TV receiver including multistandard OSD circuitry a method and apparatus for positioning the display including a comparator which compares a predetermined count (position) with a count of the received horizontal frequency to provide delayed horizontal flyback pulses and a dot and column address generator which is synchronized to start with the delayed horizontal flyback pulses. Similar vertical positioning circuits are included.

9 Claims, 6 Drawing Sheets

MULTISTANDARD OSD IN A TV RECEIVER INCLUDING DISPLAY POSITIONING

The present invention pertains to a television receiver including a microprocessor (MPU) and an on-screen display (OSD) and more particularly to a multistandard OSD including display positioning capabilities.

BACKGROUND OF THE INVENTION

In prior art television receivers an MPU is utilized to control all of the functions, e.g. color, synchronization, etc. An additional chip, which contains all of the OSD circuitry, is coupled to the MPU and provides any on-screen displays. Each prior art OSD chip is designed to operate with a specific television receiver, that is, it operates at one specific standard. Typical world standards in the television industry include NTSC, PAL, and SECAM. Further, there are many variations on each of these standards, referred to herein as multidefinitions, which multidefinitions include: improved definition TV (IDTV); extended definition TV (EDTV); high definition (HDTV); as well as interlace scan and progressive scan.

Because each chip operates on only one standard, the frequencies within the chip are constant and it is relatively simple to provide features such as horizontal positioning. However, if a different standard signal including different horizontal and vertical frequencies is received, these features can be extremely complex.

SUMMARY OF THE INVENTION

It is an object of the present invention to provide new and improved horizontal and vertical positioning circuitry.

It is a further object of the present invention to provide new and improved horizontal and vertical positioning circuitry which can be utilized in conjunction with multistandard OSD circuitry.

These and other objects are realized in a television receiver having a microprocessor and multistandard OSD circuitry including horizontal positioning circuitry adjustable to start horizontal sweeps at any of a variety of different predetermined positions.

In a preferred embodiment of the present invention, the OSD circuitry includes a master clock generator and the horizontal positioning circuitry includes a counter connected to count pulses coupled from the master clock generator. The output signals from the counter are supplied to one input of a comparator, the other input of which is connected to receive a signal indicative of a predetermined horizontal line starting position. The comparator provides a delayed horizontal flyback signal each time the two signals compare. The delayed horizontal flyback signal is then utilized to reset a counter which is counting pulses synchronized with the horizontal frequency of a television signal being received, thereby counting is started with each horizontal flyback pulse. The output of the counter is the address of horizontal dots in each pixel and the address of pixels (vertical columns) in each horizontal line.

The preferred embodiment also includes circuitry for providing vertical positioning if desired.

BRIEF DESCRIPTION OF THE DRAWINGS

Referring to the drawings, wherein like characters indicate like parts throughout the figures.

DETAILED DESCRIPTION OF THE PREFERRED EMBODIMENT

Figure 1:
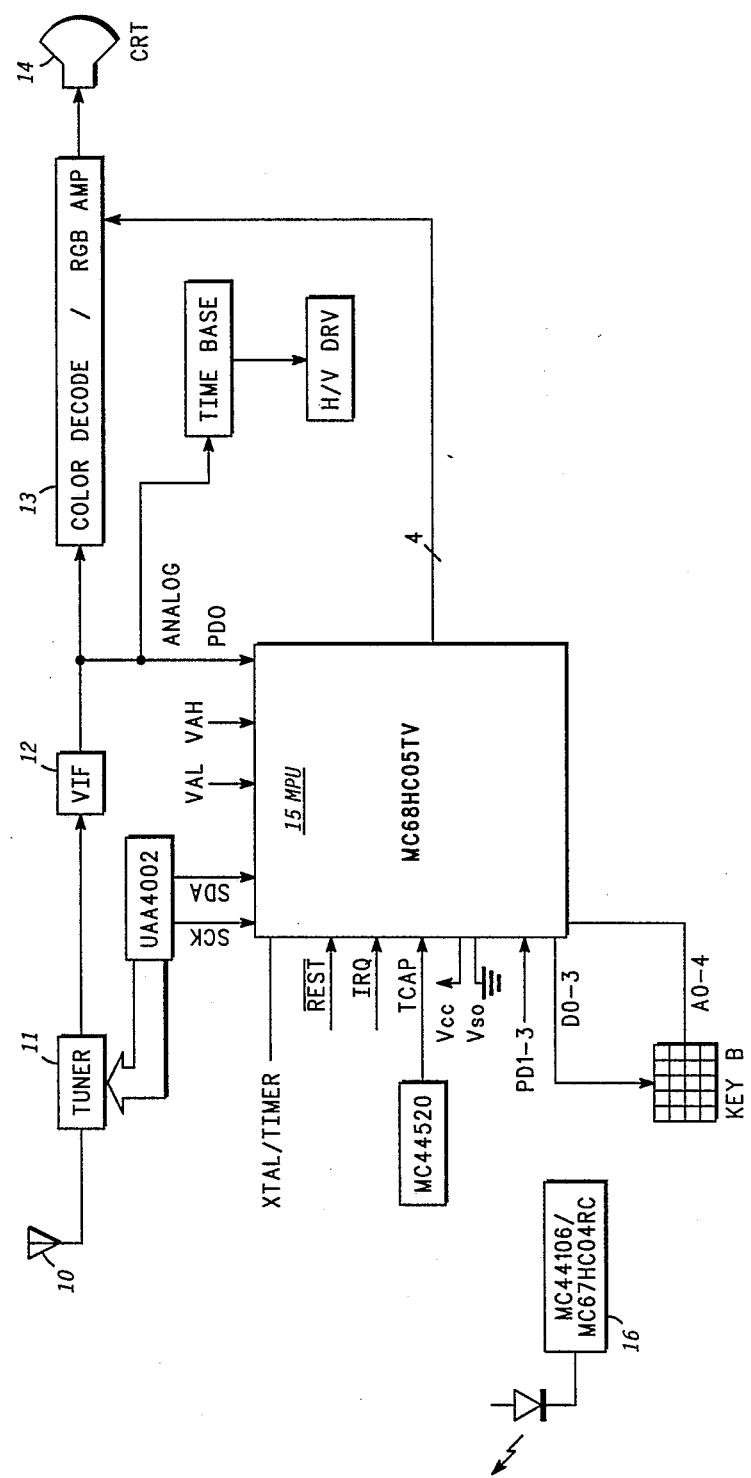
FIG. 1 is a block/schematic diagram of a television receiver embodying the present invention.

Referring specifically to FIG. 1, a multistandard television receiver is illustrated embodying the present invention. Throughout this description, the term "multistandard" refers to the various world standard television systems (e.g. NTSC, PAL, SECAM, etc.) as well as any or all of the various multidefinition systems (IDTV, EDTV, HDTV, interlace scan, progressive scan, etc.). It is of course well known in the TV field that pictures are produced by generating a plurality of fields per second with each field being defined by vertical pulses (vertical frequency) having a fixed number of horizontal lines (horizontal frequency) therebetween. An on screen display is produced by dividing each field into a plurality of pixels positioned in horizontal rows and vertical columns. Each pixel in turn is composed of dots positioned in horizontal lines and vertical lines. Each dot in each pixel is addressed by horizontal and vertical lines and each pixel is addressed by vertical columns and horizontal rows. The addresses are used to generate the desired display. While the above nomenclature will be used throughout this description it should be understood that this is simply for convenience of description and is not intended to limit the invention in any way.

The television receiver includes an antenna 10, a tuner 11, IF strip 12, color docoder 13, CRT 14, and MPU 15. As is well known in the art, MPU 15 controls the channel (or operating frequency), the color of the display, and all other controllable features such as brightness, volume, etc. A remote unit 16 communicates with MPU 15 for remote control of many controllable features. Only the basic components are illustrated in FIG. 1 and many well known peripheral components have been omitted for simplicity.

Figure 2:
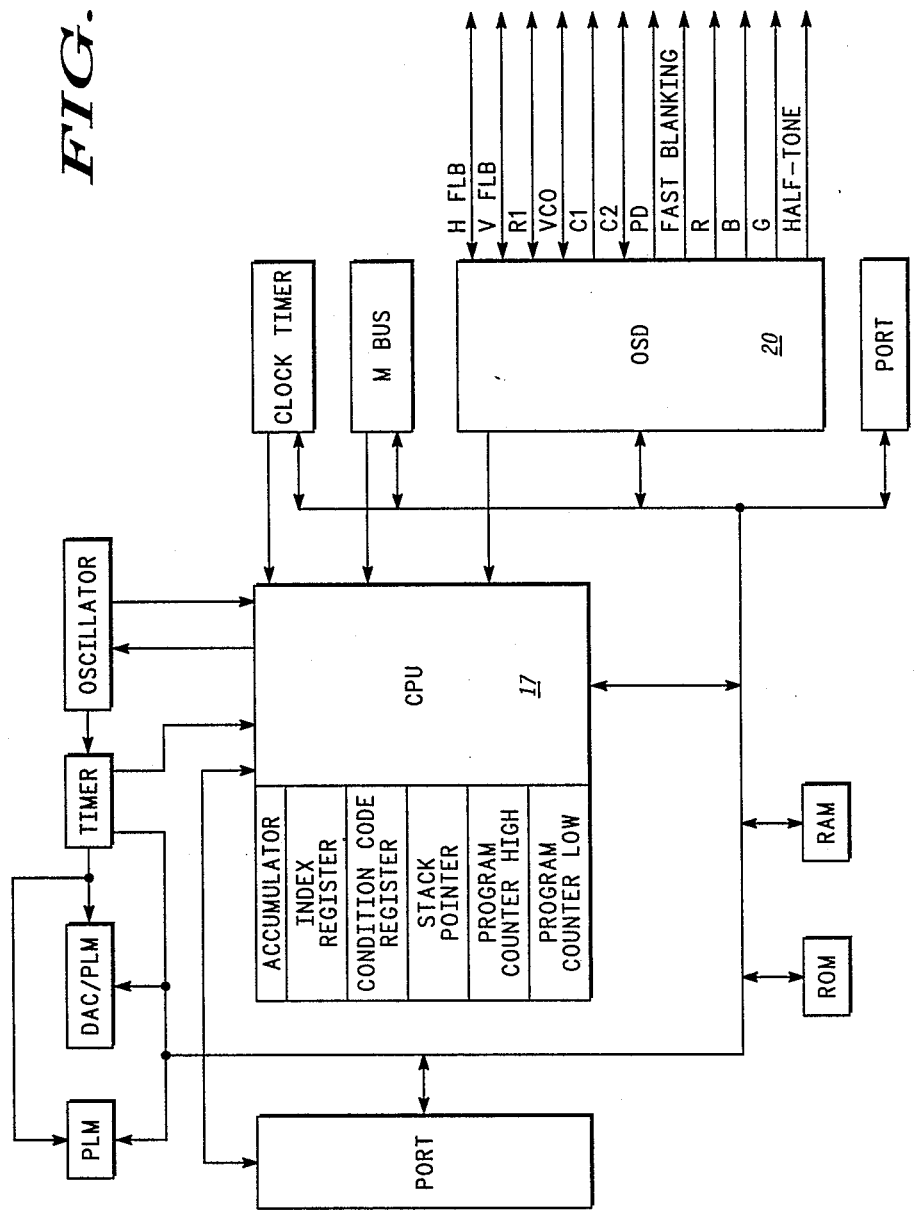
FIG. 2 is a more detailed block diagram/flow chart of the improved microprocessor illustrated in FIG. 1.

FIG. 2 illustrates a more detailed block diagram of MPU 15 with the various components, which in this specific embodiment are all formed on a single semiconductor chip. FIG. 2 also illustrates inputs and outputs to MPU 15, many of which will not be described in detail herein because they are well known to those skilled in the art. The main components of MPU 15 to be discussed herein are a CPU 17 and specific circuitry within the multistandard on-screen display (OSD) circuitry 20.

Figure 3:
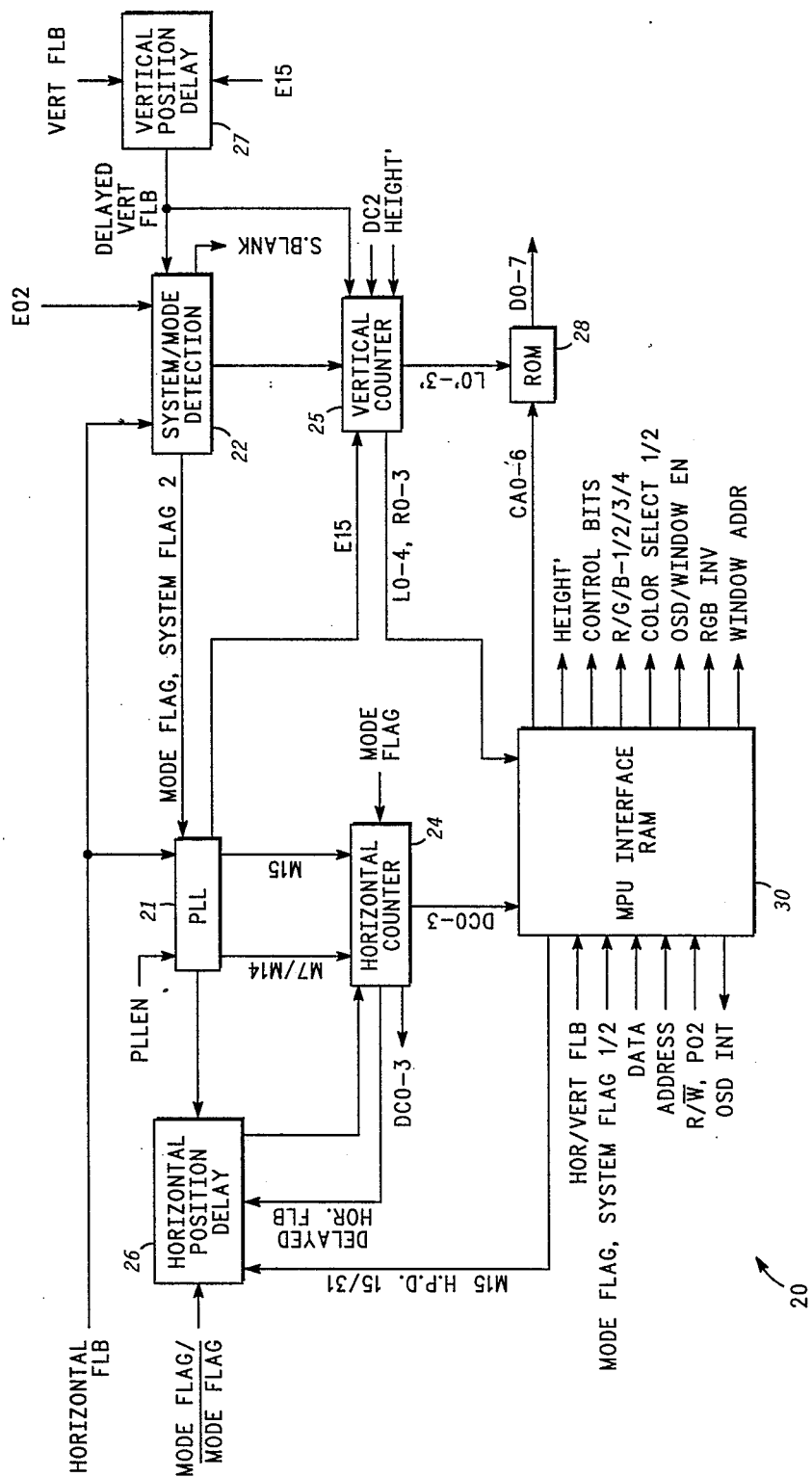
FIG. 3 is a more detailed block diagram/flow chart of the OSD circuitry of FIG. 2.

A more detailed block diragram of multistandard OSD circuitry 20 is illustrated in FIG. 3. A copending U.S. patent application, entitled "TV RECEIVER INCLUDING MULTISTANDARD OSD", filed of even date herewith, describes the operation of OSD circuitry 20 in more detail. Circuitry 20 includes a phase-locked loop (PLL) 21 a system/mode detection circuit 22, horizontal and vertical counters 24 and 25, respectively, horizontal and vertical position delay circuits 26 and 27, respectively, a 64 character ROM 28, and an MPU interface 30. PLL 21 is utilized to synchronize OSD circuitry 20 to any received standard television signal. In the present embodiment the leading edge of the horizontal flyback pulse portion of a received television signal is used to synchronize PLL 21 to the received television signal. The horizontal flyback pulse is also supplied to system/mode detection circuit 22. Master clock signals and horizontal frequency signals from PLL 21 are applied to horizontal counter 24. A third signal synchronized to the horizontal flyback pulses is applied to the vertical counter from PLL 21. System/mode detection circuit 22 supplies flags (e.g. mode flag) to PLL 21, horizontal position delay 26, horizontal and vertical counters 24 and 25, and MPU interface 30. Horizontal counter 24 supplies dot and column addresses to horizontal position delay circuitry 26, MPU interface 30, and other portions of the circuitry not shown herein. Vertical counter 25 supplies line and row addresses to ROM 28 and MPU interface 30. Vertical position delay circuitry 27 receives vertical flyback pulses from the standard television signal and supplies a delayed vertical flyback signal to system/mode detection circuit 27 and to vertical counter 25. ROM 28 receives signals from MPU interface 30 and supplies signals to remaining portions of OSD circuitry 20 (not illustrated) to generate the predetermined on-screen display.

Figure 4:
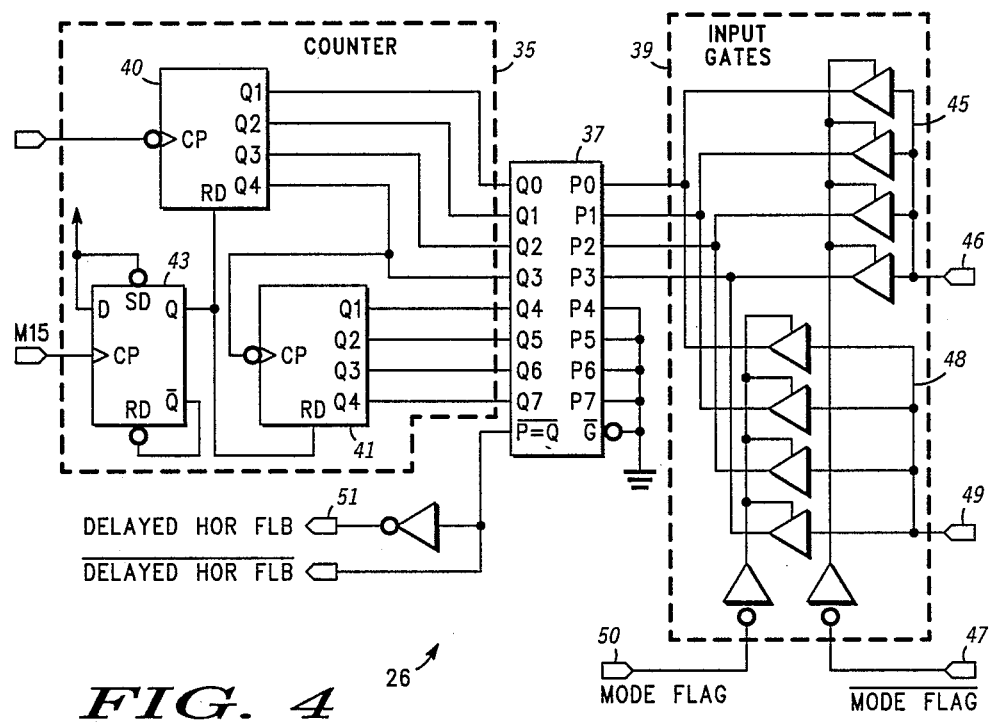
FIG. 4 is a schematic diagram of horizontal position delay circuitry.

Referring specifically to FIG. 4, horizontal position delay circuit 26 embodying a part of the present invention is illustrated schematically. Horizontal position delay circuit 26 includes a counter 35, a comparator 37 and input gates 39. Counter 35 includes a first stage 40 and a second stage 41, each of which is constructed to divide an incoming clock signal by 2, 4, 8 and 16. The incoming clock signal applied to first stage 40 is obtained from horizontal direction counter 24, as well be explained presently. The divide by 16 output of first stage 40 is supplied as a clock input to second stage 41. The four outputs of first stage 40 and the four outputs of second stage 41 are applied to a first 8 inputs of comparator 37. Counter 35 also includes a D-type flipflop 43 having the output thereof connected to the reset inputs of first stage 40 and second stage 41. The clock input of flipflop 43 is connected to receive a horizontal frequency signal M15 which is in phase with the master clock and its derivative signals and synchronized with the horizontal flyback pulses of a received television signal by PLL 21. In this multistandard OSD the signal applied to the clock input of flipflop 43 will be at a frequency of approximately 15 KHz or approximately 31 KHz, depending upon the television signal being received. Input gates 39 include a first four gates 45 having signal terminals connected to an input terminal 46 and control terminals connected to an input terminal 47 and a second four gates 48 having signal terminals connected to an input terminal 49 and control terminals connected to an input terminal 50. Input terminal 46 is connected to receive a 4 bit signal indicative of a predetermined horizontal line starting position when the received telelvison signal has approximately 31 KHz horizontal frequency and input terminal 49 is connected to receive a 4 bit signal indicative of the predetermined horizontal line starting position when the received television signal has approximately a 15 KHz horizontal frequency. Input terminals 47 and 50 are connected to receive an inverted mode flag and a mode flag, respectively, from system/mode detection circuit 22, which signals open gates 45 or 48 to allow the proper horizontal frequency signal to pass therethrough. The outputs of the four gates 45 and the four gates 48 are connected to the first four of a second eight inputs of comparator 37. The remaining four of the second eight inputs are connected to ground. An output of comparator 37 is supplied at an output terminal 51.

PLL 21 and system/mode detection circuit 22 are synchronized with the horizontal flyback pulse of the received television signal. Because of this synchronization, as is explained more fully in the above described co-pending application, the pulse width of the horizontal flyback pulses affects the horizontal position of the display characters generated by OSD 20. Since the pulse width of the horizontal flyback pulses affects the horizontal position of the display characters, it is required to generate a fixed length pulse from the input horizontal flyback pulse. This fixed length pulse, herein referred to as the delayed horizontal flyback pulse, must be correctly delayed from the input horizontal flyback pulse so that the character display position is aligned correctly on the screen. To provide these features a signal representative of a central bit (DC2) in the address of each pixel in the horizontal line is supplied to the clock input of first stage 40 of counter 35. Because the D-flipflop 43, which is receiving the horizontal frequency at the clock input thereof, resets counter 35 each horizontal line, counter 35 is essentially counting the pixels in each horizontal line. By providing at terminal 46 a signal representative of a predetermined position for a 31 KHz horizontal frequency and at terminal 49 a signal for a 15 KHz horizontal frequency, comparator 37 essentially selects the desired pixel in the horizontal line at which the display will begin and provides an output pulse representative thereof. This output pulse from comparator 37 is the delayed horizontal flyback pulse which appears at output terminal 51.

Figure 5:
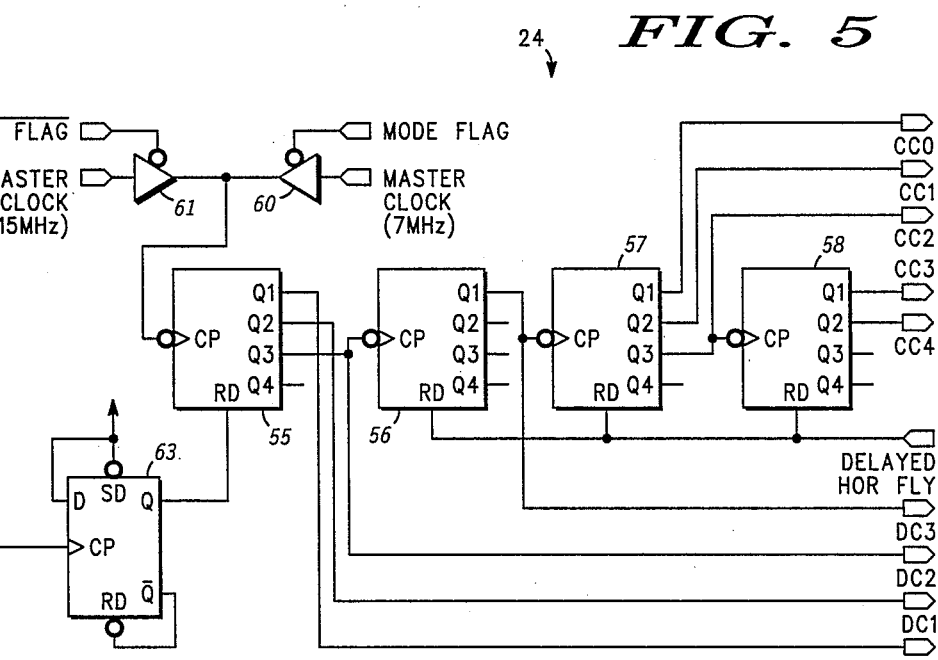
FIG. 5 is a schematic diagram of a horizontal direction counter.

Referring specifically to FIG. 5, horizontal direction counter 24 is illustrated schematically. Horizontal direction counter 24 includes four stages 55, 56, 57 and 58. In this specific embodiment stages 55 and 56 serve as a pixel counter while stages 57 and 58 serve as a column counter. A pair of input gates 60 and 61 are operated by the mode flag and the inverted mode flag, respectively, to provide either master clock frequency 7 MHz or master clock frequency 14 MHz (depending upon the received television signal) to the clock input of first stage 55. A D-flipflop 63 is connected to receive the synchronized horizontal frequency signal M15 from PLL 21 at the clock input thereof. The output of D-flipflop 63 is connected to the reset of first stage 55 and synchronizes first stage 55 to the horizontal frequency. It will be understood that first stage 55 counts the number of dots in a horizontal line. First stage 55 divides the input signal by 2, 4 and 8 and these outputs represent 3 bits in the address of the dots in each pixel. The third output of first stage 55 is also supplied to the clock input of second stage 56, which divides the clock input by 2 and provides this signal at an output as a fourth (most significant) bit in the dot addresses as well as supplying the signal to the clock input of third stage 57. Third stage 57 divides the clock input by 2, 4 and 8 and supplies these signals to three output terminals representing the first 3 bits in a column address. The third output of third stage 57 is supplied to the clock input of fourth stage 58 which divides the signal by 2 and 4 and supplies these outputs to two terminals representing the last 2 bits of the column address. To insure that the column address starts at the horizontal position selected in position delay circuit 26, second stage 56, third stage 57 and fourth stage 58 are reset by the delayed horizontal flyback signal from output terminal 51 of horizontal position delay circuit 26. The dot and column addresses are utilized in other circuits of OSD circuitry 20 to accurately generate desired displays at selected positions on the screen of the television.

Figure 6:
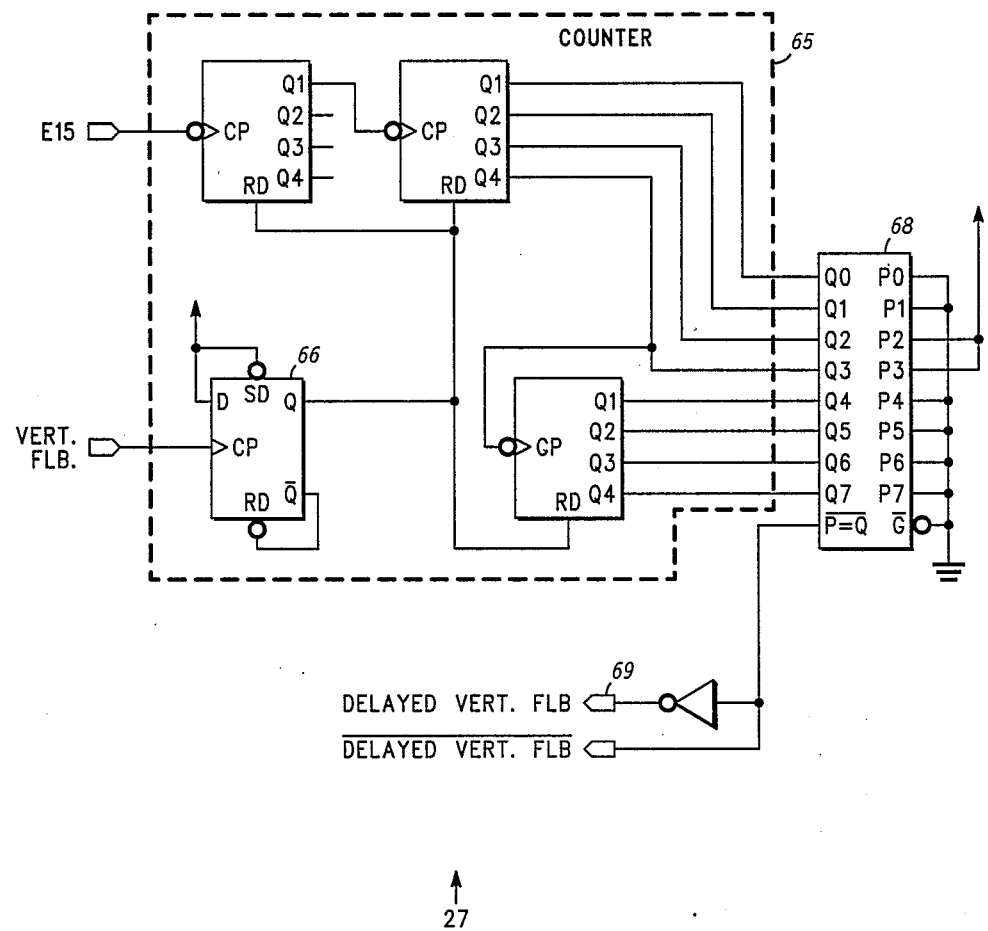
FIG. 6 is a schematic diagram of vertical position delay circuitry.

In some applications it may be desirable to delay the vertical position as well as or instead of the horizontal position and, accordingly, vertical position delay circuit 27, illustrated in FIG. 6 is provided for that purpose. Vertical position delay circuit 27 is essentially similar to horizontal position delay circuit 26, except that a counter 65 includes three stages connected to count a horizontal frequency signal supplied by PLL 21. All three of the stages of counter 65 are reset by an output from a D-flipflop 66, which is clocked by vertical flyback pulses from the received television signal. As in horizontal position delay circuit 26, the outputs of counter 65 are supplied to one input of a comparator 68 which compares the count to a predetermined word to generate a delayed vertical flyback pulse on an output terminal 69. In the present embodiment the predetermined word supplied to the second inputs of comparator 68 includes a pair of terminals connected to a high voltage with the remaining terminals connected to ground so that the vertical display always begins at the same position regardless of the type of television signal being received. It will of course be understood that any other word might be applied to the second input terminals of comparator 68 to begin the vertical display at any selected position.

Figure 7:
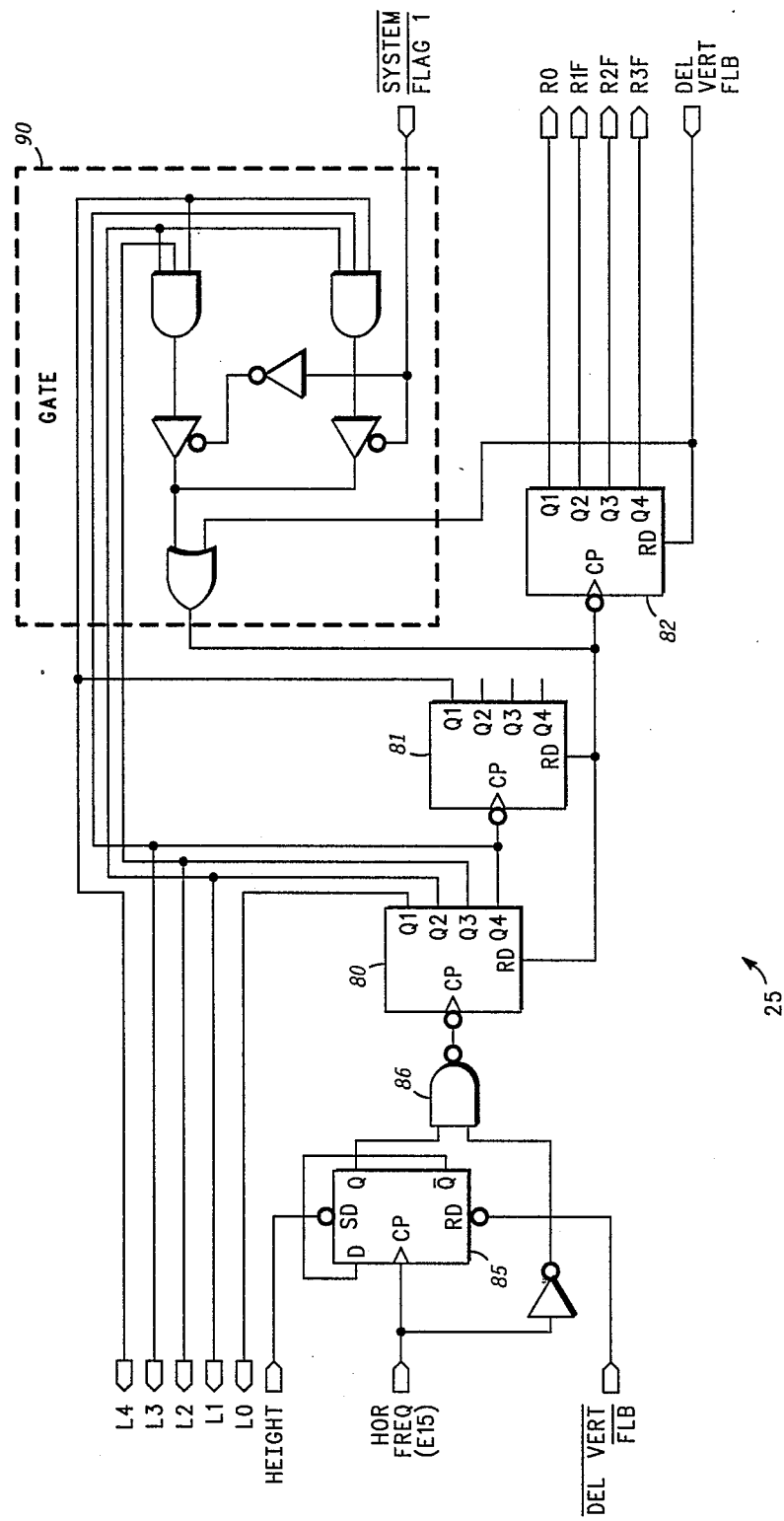
FIG. 7 is a schematic diagram of a vertical direction counter.

Referring specifically to FIG. 7, vertical direction counter 25 is illustrated schematically. Vertical direction counter 25 includes a three stage counter 80, 81 and 82. An input D-type flipflop 85 is connected to receive the horizontal frequency signal from PLL 21 at the clock input thereof, which signal is also supplied through an inverter to a NAND gate 86. Flipflop 85 is set by a height signal which is a high (1) or low (0) signal. In the present embodiment the characters of the display can be provided with a double height in which case the height signal sets flipflop 85 and the row count is slowed down by one half. The output of flipflop 85 is supplied to a second input of NAND gate 86. The output signals from NAND gate 86 are supplied at the clock input of first stage 80. First stage 80 divides the clock input signal by 2, 4, 8 and 16, all four of which are supplied as the first four bits of a line address signal. The fourth output of first stage 80 is supplied as a clock input to second stage 81, which divides the clock input by 2 and supplies this output as the fifth bit of a line address signal. The output of second stage 81 is also supplied as an input to a gate 90 along with the delayed vertical flyback pulses from vertical position delay circuit 27 and an inverted system flag 1 signal from system/mode detection circuit 22. An output signal from gate 90 is supplied as a clock input to third stage 82 and as a reset to first stages 80 and 81. Third stage 82 divides the clock input by 2, 4, 8 and 16 and supplies these four output signals as row address signals in each line. The inverted system flag 1 signal supplied to gate 90 controls gate 90 in accordance with the vertical frequency of the television signal being received. The delayed vertical flyback signal is supplied to an OR gate in gate 90 and to the reset of third stage 82 so that the row address provided by third stage 82 starts only when the vertical display begins. Further, an inverted delayed vertical flyback signal is applied to the reset of D-flipflop 85 to ensure that line counting by first and second stages 80 and 81 begins with the beginning of the vertical display. The line and row addresses are utilized in other circuits of OSD circuitry 20 in conjunction with dot and column addresses to accurately generate desired displays at selected positions on the television screen.

Thus, a television receiver with microprocessor and multistandard OSD circuitry is disclosed, which OSD circuitry includes predetermined selectable horizontal and/or vertical positioning of the display. Further, this selectable positioning of the horizontal and/or vertical display operates automatically with a multistandard OSD circuit. In addition, the positioning circuitry is relatively simple to construct and is synchronized to the received television signal so that it is accurate and stable.

While we have shown and described a specific embodiment of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

What we claim is:

1. A television receiver comprising:
   a microprocessor including a CPU; and
   multistandard on screen display circuitry coupled to said CPU including horizontal position circuitry adjustable to start horizontal lines at any of a variety of different predetermined positions.

2. A television receiver as claimed in claim 1 wherein the display circuitry further includes a master clock generator and the horizontal position circuitry further includes a counter synchronized with the horizontal frequency of a received television signal, said counter being connected to count pulses coupled from said master clock generator and supply an output signal indicative of the count, and a comparator having first input terminals connected to receive the output signal from said counter and having second input terminals connected to receive a signal indicative of a predetermined horizontal line starting position, said comparator providing a delayed horizontal flyback signal when the output signal from said counter compares to the signal indicative of the predetermined horizontal line starting position.

3. A television receiver as claimed in claim 2 wherein the horizontal position circuitry further includes a horizontal direction counter having an input connected to receive a signal from said master clock generator, said horizontal direction counter further having a reset input connected to receive the delayed horizontal flyback signal from said comparator and providing column addresses including the predetermined horizontal line starting position.

4. A television receiver as claimed in claim 3 wherein the horizontal position circuitry further includes a dot counter having an input terminal connected to receive a signal from the master clock generator, a reset terminal connected to receive pulses synchronized with the horizontal frequency of a received television signal, and an output terminal for providing dot addresses thereon.

5. A television receiver as claimed in claim 1 wherein the multistandard on screen display circuitry further includes vertical position circuitry adjustable to start vertical sweeps at any of a variety of different predetermined positions.

6. A television receiver as claimed in claim 5 wherein the vertical position circuitry includes a counter connected to count pulses synchronized with the horizontal frequency of a received television signal and supply an output signal indicative of the count, said counter further having a reset input connected to receive vertical flyback pulses from the received television signal to further synchronize the output signal with the received television signal, and said vertical position circuitry further including a comparator having first input terminals connected to receive the output signal from said counter and having second input terminals connected to receive a signal indicative of a predetermined vertical line starting position, said comparator providing a delayed vertical flyback signal when the output signal from said counter compares to the signal indicative of the predetermined vertical sweeps starting position.

7. A television receiver as claimed in claim 6 wherein the vertical position circuitry further includes a vertical direction counter having an input connected to receive the pulses synchronized with the horizontal frequency of a received television signal and a reset input connected to receive the delayed vertical flyback signals from said comparator, said vertical direction counter providing line address signals including the predetermined vertical line starting position.

8. A television receiver as claimed in claim 7 wherein the vertical position circuitry further includes a row counter having an input terminal connected to receive a signal generated by the pulses synchronized with the horizontal frequency of a received television signal, a reset terminal connected to receive the delayed vertical flyback signals, and an output terminal for providing row addresses thereon.

9. In a television receiver, a method of horizontally positioning a display comprising the steps of:
receiving a television signal having horizontal flyback pulses;
generating a horizontal frequency clock signal synchronized with the horizontal flyback pulses and a master clock signal;
generating multi-bit dot addresses for each horizontal line by counting the master clock signal and starting the count with each pulse of the horizontal frequency clock signal;
counting a selected bit of each of the multi-bit dot addresses between periods of the horizontal frequency clock signal;
comparing the count to a predetermined count indicative of a preselected horizontal delay;
generating a delayed horizontal flyback pulse each time the count and the predetermined count compare; and
generating column addresses for each horizontal line by counting the master clock signal and utilizing said delayed horizontal flyback pulse to start the count for each horizontal line.

* * * * *